US009791328B2

United States Patent
Chu

(10) Patent No.: US 9,791,328 B2
(45) Date of Patent: Oct. 17, 2017

(54) WATERPROOF FOOD THERMOMETER PROBE AND ASSOCIATED METHODS

(71) Applicant: Ewig Industries Cacao Commercial Offshore Ltd., Shenzhen (CN)

(72) Inventor: Luk Wah Jackson Chu, Kowloon (HK)

(73) Assignee: EWIG INDUSTRIES MACAO COMMERCIAL OFFSHORE LTD, Macau (CN)

( * ) Notice: Subject to any disclaimer, the term of this patent is extended or adjusted under 35 U.S.C. 154(b) by 287 days.

(21) Appl. No.: 14/133,266

(22) Filed: Dec. 18, 2013

(65) Prior Publication Data

US 2015/0168232 A1    Jun. 18, 2015

(51) Int. Cl.

| G01K 1/00 | (2006.01) |
|---|---|
| G01K 13/00 | (2006.01) |
| G01K 1/12 | (2006.01) |
| G01K 1/14 | (2006.01) |
| G01K 1/02 | (2006.01) |
| G01K 1/08 | (2006.01) |
| B29C 45/14 | (2006.01) |
| B29L 31/00 | (2006.01) |

(52) U.S. Cl.
CPC ........ *G01K 13/00* (2013.01); *B29C 45/14467* (2013.01); *G01K 1/024* (2013.01); *G01K 1/08* (2013.01); *G01K 1/12* (2013.01); *G01K 1/14* (2013.01); *B29C 45/14549* (2013.01); *B29K 2995/0069* (2013.01); *B29L 2031/752* (2013.01); *G01K 2207/06* (2013.01)

(58) Field of Classification Search
CPC .......... G01K 13/00; G01K 1/08; G01K 1/024; G01K 1/12; G01K 1/14; G01K 2207/06; B29C 45/14467; B29C 45/14549; B29L 2031/752; B29K 2995/0069
See application file for complete search history.

(56) References Cited

U.S. PATENT DOCUMENTS

| 4,081,645 A * | 3/1978 | Javes ................. G01K 13/00 219/516 |
|---|---|---|
| 4,984,904 A * | 1/1991 | Nakano ................ G01K 1/08 136/232 |
| 5,844,135 A * | 12/1998 | Brammer ............. G01K 13/02 374/E1.011 |
| 6,811,308 B2 | 11/2004 | Chapman et al. |
| 7,004,626 B1 * | 2/2006 | Giberson ............... G01K 7/02 136/230 |
| 8,398,303 B2 * | 3/2013 | Kuhn ................... G01K 1/024 219/712 |
| 2006/0215731 A1 * | 9/2006 | Gadonniex ............ G01K 1/16 374/208 |

(Continued)

OTHER PUBLICATIONS

Grillmark, "Gillmark Remote Probe Grill Thermometer" found at http://www.amazon.com/Grillmark-Remote-Probe-Grill-Thermometer/dp/B003CGUDP6, printed Feb. 18, 2014, however, applicant admits prior art, 4 pages.

(Continued)

*Primary Examiner* — Lisa Caputo
*Assistant Examiner* — Janice M Soto
(74) *Attorney, Agent, or Firm* — Lathrop Gage LLP

(57) ABSTRACT

A waterproof food temperature probe includes a penetrating portion for inserting into food during cooking; a cable for coupling the penetrating portion to a display unit separated from the penetrating portion; and, a high temperature resistant seal portion permanently covering at least part of the penetrating portion and at least part of the cable. The seal portion prevents moisture from entering the penetrating portion thereby preventing the temperature probe from malfunctioning.

15 Claims, 8 Drawing Sheets

(56) References Cited

U.S. PATENT DOCUMENTS

| | | | | |
|---|---|---|---|---|
| 2007/0258506 A1* | 11/2007 | Schwagerman | ......... | G01K 1/08 374/179 |
| 2008/0043809 A1* | 2/2008 | Herbert | ................. | G01K 1/026 374/163 |
| 2012/0201269 A1* | 8/2012 | Mujumdar | ............... | G01K 1/16 374/141 |
| 2013/0182745 A1* | 7/2013 | Hertel | ...................... | G01K 1/14 374/185 |
| 2013/0329767 A1* | 12/2013 | Jambor | ................... | G01K 7/22 374/185 |

OTHER PUBLICATIONS

Klockit, "AcuRite 00648 Programmable Cooking Thermometer & Timer," found at http://www.klockit.com/products/product. aspx?sku=16006&utm_source=google&utm_medium=cpc &utm_campaign=pla&gclid=CLm7oO_ DgrgCFWRp7AodFTUAnA, printed Feb. 18, 2014, however, applicant admits prior art, 2 pages.

Brookside, "Replacement Probe For Grill Alert," found at http://www.brookstone.com/grill-alert-probe-replacement, printed Feb. 18, 2014, however, applicant admits prior art, 2 pages.

Amwei Thermistor, "NTC Themistors Temperature Sensor Probe Assemblies," found at http://www.amwei.com/views.asp?hw_ id=61, printed Feb. 18, 2014, however, applicant admits prior art, 14 pages.

\* cited by examiner

SECTION C-C

US 9,791,328 B2

WATERPROOF FOOD THERMOMETER PROBE AND ASSOCIATED METHODS

BACKGROUND

This invention relates generally to cooking accessories and specifically to waterproof meat thermometer probes and methods of manufacturing the same.

Accurate temperatures of meat are particularly necessary in the food preparation industry. Incorrect meat temperatures can cause various diseases to, and even death of, people consuming or handling the meat.

Thermometer probes have gained popularity for grilling and baking purposes. For one example, U.S. Pat. No. 6,811,308 to Chapman et al. discloses a wireless remote cooking thermometer system including a temperature probe insertable into the food being cooked and a substantially flexible communication line extending between the temperature probe and a first unit adapted to transmit temperature readings to a display unit. Chapman's disclosure allows the temperatures read from the temperature probe to be sent wirelessly to a display unit for determining meat taste characteristics on the meat (i.e. rare, medium rare, medium, medium well, well done, etc.).

Temperature probes products are generally separated into two types of categories: "leave-in" probes (such as that disclosed in Chapman) and "instant read" thermometers".

Instant read probes such as the Taylor® brand "Compact Instant-Read Digital Thermometer" and the CDN ProAccurate® Quick-Read™ Waterproof Pocket Thermometer are specifically made to be able to quickly read the temperature when inserted into meat. However, these probes are not able to be left in the meat while the meat is on the grill or in the oven. While water proof, the plastic waterproof covering is not able to withstand the high temperatures utilized during grilling and/or baking.

Leave in probes include products such as the OXO brand Good Grips® "Chef's Digital Leave-In Thermometer" and the Maverick® brand "Redi-Check®". These probes, as well as similar probes of other brands, allow the temperature probe to be left in the meat during the cooking process. Leave in probes often fail due to moisture getting within the probe where the cable from the display unit connects to the probe. Certain probes cover the connection point with heat resistant rubber, however this rubber is removable and therefore moisture still can get within the probe. As a result, leave in probes are not waterproof. Leave in probes are not able to be machine washed and therefore are a hassle to clean.

SUMMARY OF THE INVENTION

In an embodiment, a waterproof thermometer probe includes a penetrating portion for inserting into food during cooking; a cable for coupling the penetrating portion to a display unit separated from the penetrating portion; and, a high temperature resistant seal portion permanently covering at least part of the penetrating portion and at least part of the cable. The seal portion providing a moisture bather to prevent water from entering the probe portion.

In a second embodiment, a method for manufacturing a waterproof thermometer probe includes forming a hollow tube portion of the probe; positioning a temperature sensor within the hollow tube portion; connecting a cable to the penetrating portion such that the temperature sensor is electrically coupled to the cable; and, molding a seal portion such that the seal portion permanently covers at least part of the cable and part of the hollow tube portion.

DETAILED DESCRIPTION OF THE DRAWINGS

Figure 1:
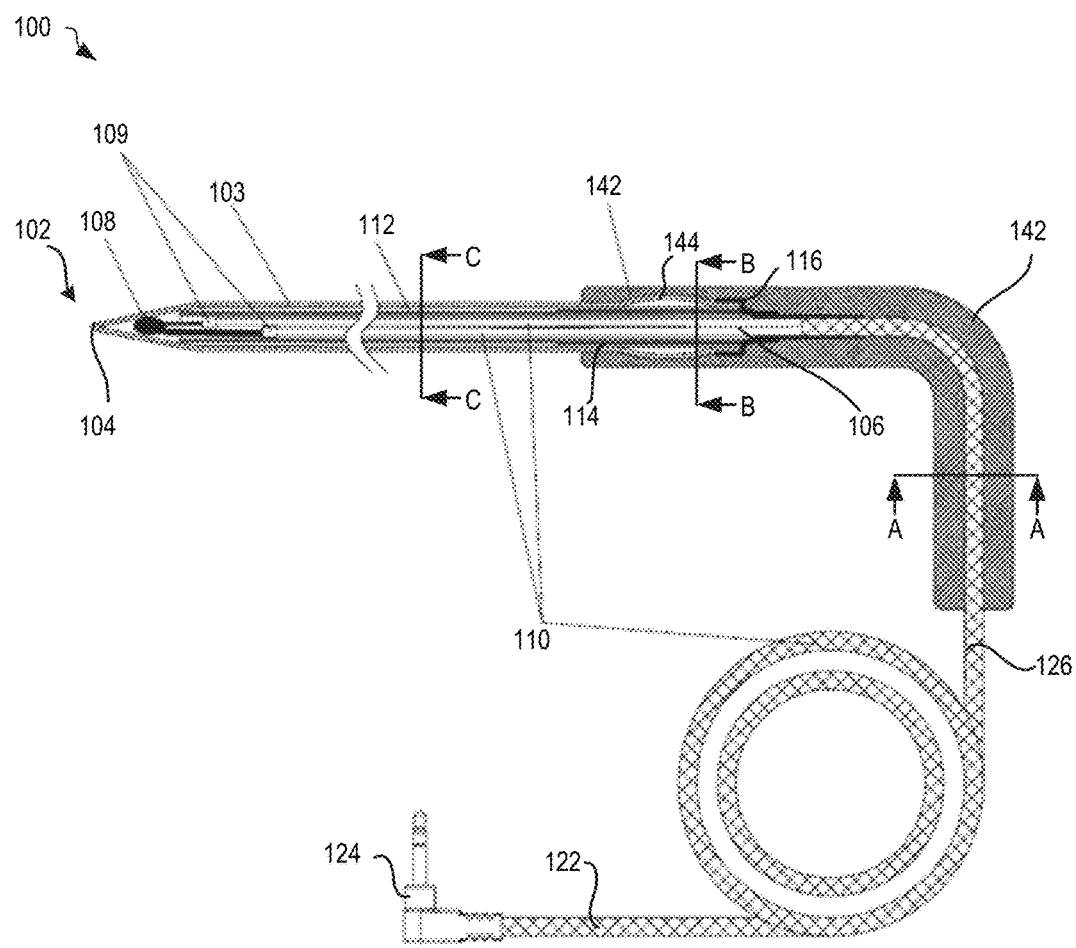
FIG. 1 depicts an exemplary waterproof food thermometer probe, in one embodiment.
Figure 2:
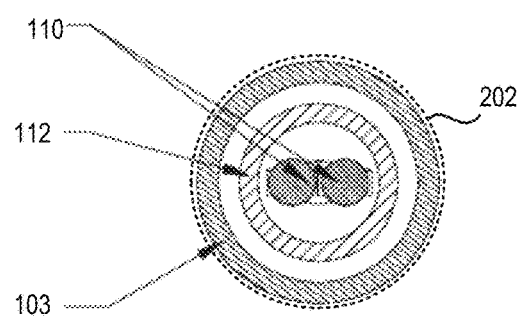
FIG. 2 depicts a cross section view of the probe of FIG. 1, along section line C-C.
Figure 3:
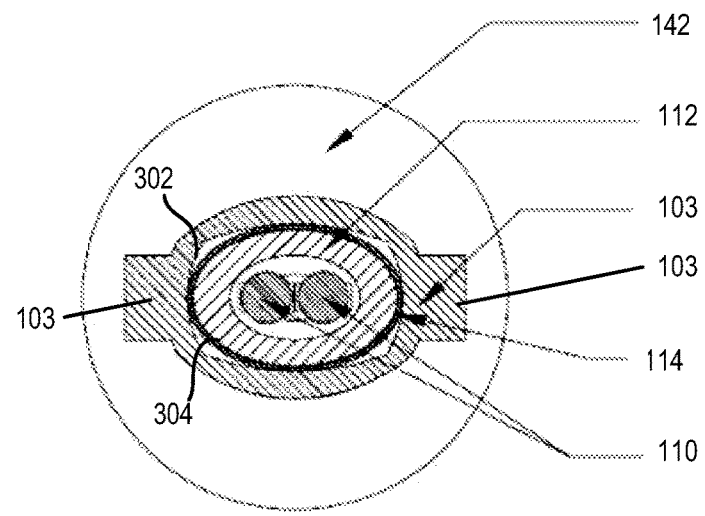
FIG. 3 depicts a cross section view of the probe of FIG. 1, along section line B-B.
Figure 4:
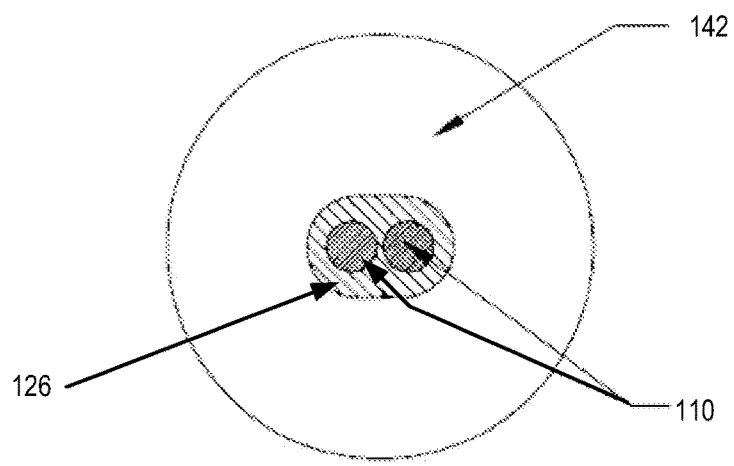
FIG. 4 depicts a cross section view of the probe of FIG. 1, along section line A-A.
Figure 5:
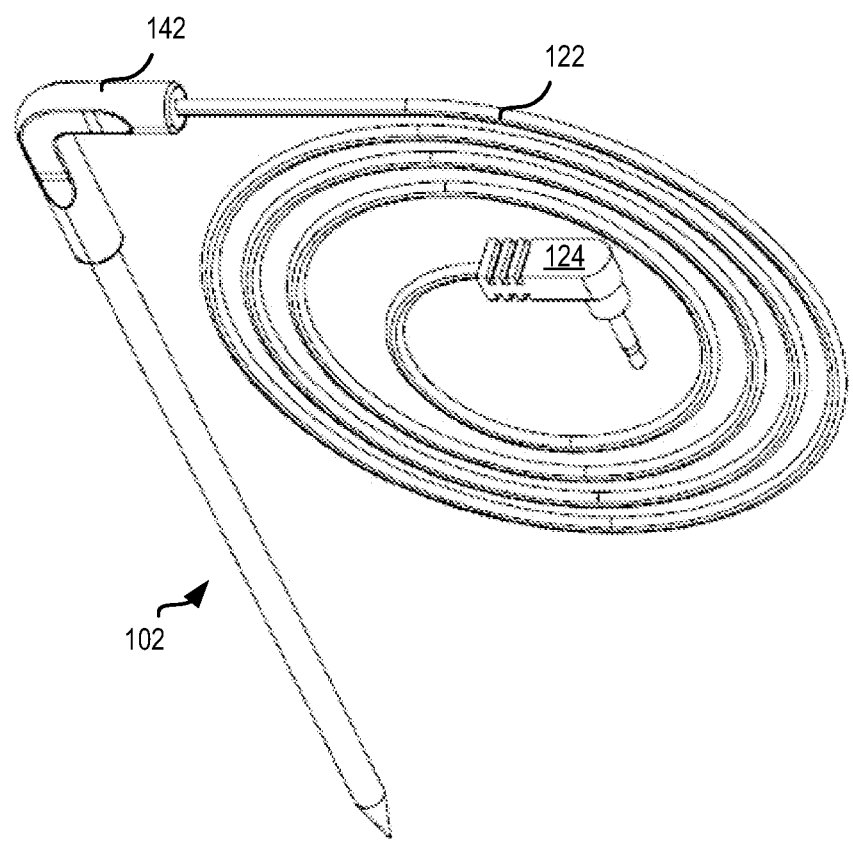
FIG. 5 depicts a first perspective view of the probe of FIG. 1.
Figure 6:
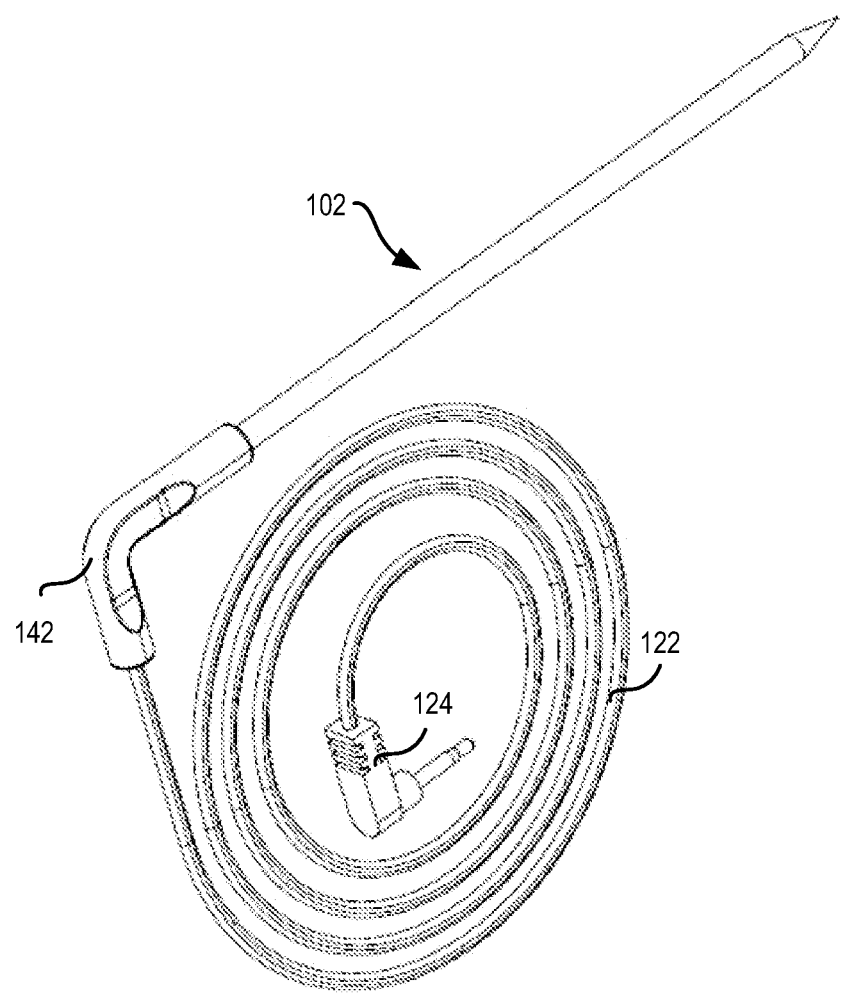
FIG. 6 depicts a second perspective view of the probe of FIG. 1.

FIG. 1 depicts an exemplary waterproof food thermometer probe 100, in one embodiment. FIG. 2 depicts a cross section view of probe 100, of FIG. 1, along section line C-C. FIG. 3 depicts a cross section view of probe 100, of FIG. 1, along section line B-B. FIG. 4 depicts a cross section view of probe 100, of FIG. 1, along section line A-A. FIG. 5 depicts a first perspective view of probe 100, of FIG. 1. FIG. 6 depicts a second perspective view of probe 100, of FIG. 1. FIGS. 1-6 are best viewed together with the following description.

Probe 100 may be left within the food during the cooking process and may attach to a leave-in temperature unit (not shown). Meat thermometer probe 100 includes penetrating portion 102, a cable 122 and a seal 142.

Penetrating portion 102 includes a hollow tube 103 having a first end 104 and a second end 106. First end 104 may be pointed such that it may easily be pierced into the food. Penetrating portion 102 further includes at least one temperature sensor 108 located at first end 104 that is electrically coupled to wires 110 of cable 122 at second end 106. In one embodiment, sensor 108 is coupled to wires 110 via copper clip 109. Hollow tube 103 is for example made from stainless steel, high temperature resistance plastic, or other material capable of resisting heat produced during the cooking process. An outer surface of hollow tube 103 may be coated with a non-stick coating 202 (illustrated as a dashed line in FIG. 2), such as Teflon® coating, for ease of cleaning.

Penetrating portion 102 may further include a glass fiber tube 112 positioned within hollow tube 103. Glass fiber tube 112 may extend along a portion of the hollow tube 103 and thus along a length of the penetrating portion 102 from second end 106 towards first end 1041 however, glass fiber tube 112 may not surround temperature sensor 108. As illustrated in FIG. 2, glass fiber tube 112 surrounds a portion of wires 110 within penetrating portion 102. By surrounding wires 110, glass fiber tube 112 thermally insulates wires 110 within hollow tube 103 thereby protecting wires 110 from melting under high temperatures.

Penetrating portion 102 may further include first seal 114 (also referred to herein as a "moisture seal"). First seal 114 is for example a Teflon® heat shrink tube surrounding at least part of glass fiber tube 112 that provides protects wires 110 from breaking when hollow tube 103 is crimped at second end 106 during manufacturing. As illustrated in FIG. 3, first seal 114 fills a space between an inner surface 302 of hollow tube 103 and an outer surface 304 of glass fiber tube 112 to prevent ingress of moisture. Accordingly, wires 110 are prevented from damage since first seal 114 is compressed when hollow tube 103 is crimped. First seal 114 for example only extends along a portion of hollow tube 103 of penetrating portion 102. In one embodiment, first seal 114 extends a distance, in the lengthwise direction, that is shorter than the distance that glass fiber tube 112 extends.

Penetrating portion 102 may further include a second seal 116 (also referred to herein as a "moisture seal"). Second seal 116 is for example a Teflon® heat shrink tube surrounding at least a portion of cable 122 and hollow tube 103 proximate to second end 106. Second seal 116 provides a moisture barrier to prevent moisture from entering between cable 122 and hollow tube 103.

Cable 122 includes a plug 124, formed at an opposite end from penetrating portion 102, for coupling probe 100 to a display/control unit (not shown). Display unit may be an electronic display for displaying the temperature read from sensors 108. Alternately, plug 124 may couple with, or be replaced by, a transmitter unit not shown) that communicates with a wireless display or a mobile display such as a computer, a tablet, smartphone or other mobile electronic device. Cable 122 may include a braided wire shell 126 that surrounds and protects wires 110 within cable 122. For example, braided wire shell 126 is completely sealed and made from stainless steel such that wires 110 are insulated from heat and/or moisture within cable 122. Cable 122 connects to penetrating portion 102 at second end 106.

Seal 142 surrounds second end 106 of penetrating portion 102 and a portion of cable 122 such that probe 100 is completely waterproof. Seal 142 prevents moisture from entering penetrating portion 102 between the small gaps between wires of the braided wire shell 126 and between braided wire shell 126 and hollow tube 103. Seal 142 may act as a handle and insulator. Seal 142 is for example made from high temperature resistance injected plastic. The high temperature resistance injected plastic is formed around cable 122 and penetrating portion 102. Once the plastic cools, it becomes permanently rigid and shaped. Seal 142 is capable of withstanding high temperatures (for example up to at least 500 degrees Fahrenheit).

Figure 8:
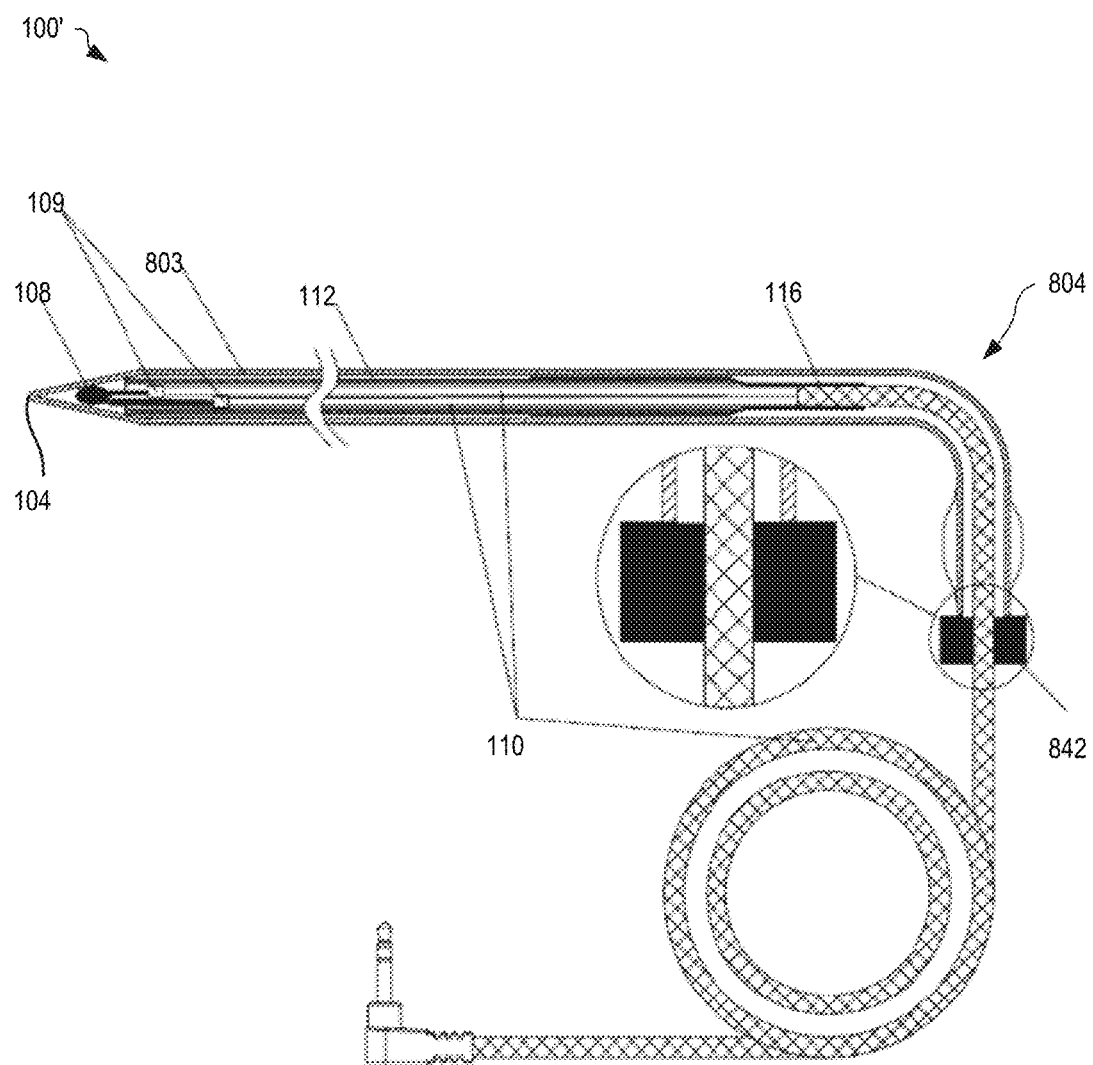
FIG. 8 depicts an exemplary waterproof food thermometer probe having a seal formed by welding, soldering, or brazing to provide waterproofing, in one embodiment.
Figure 9:
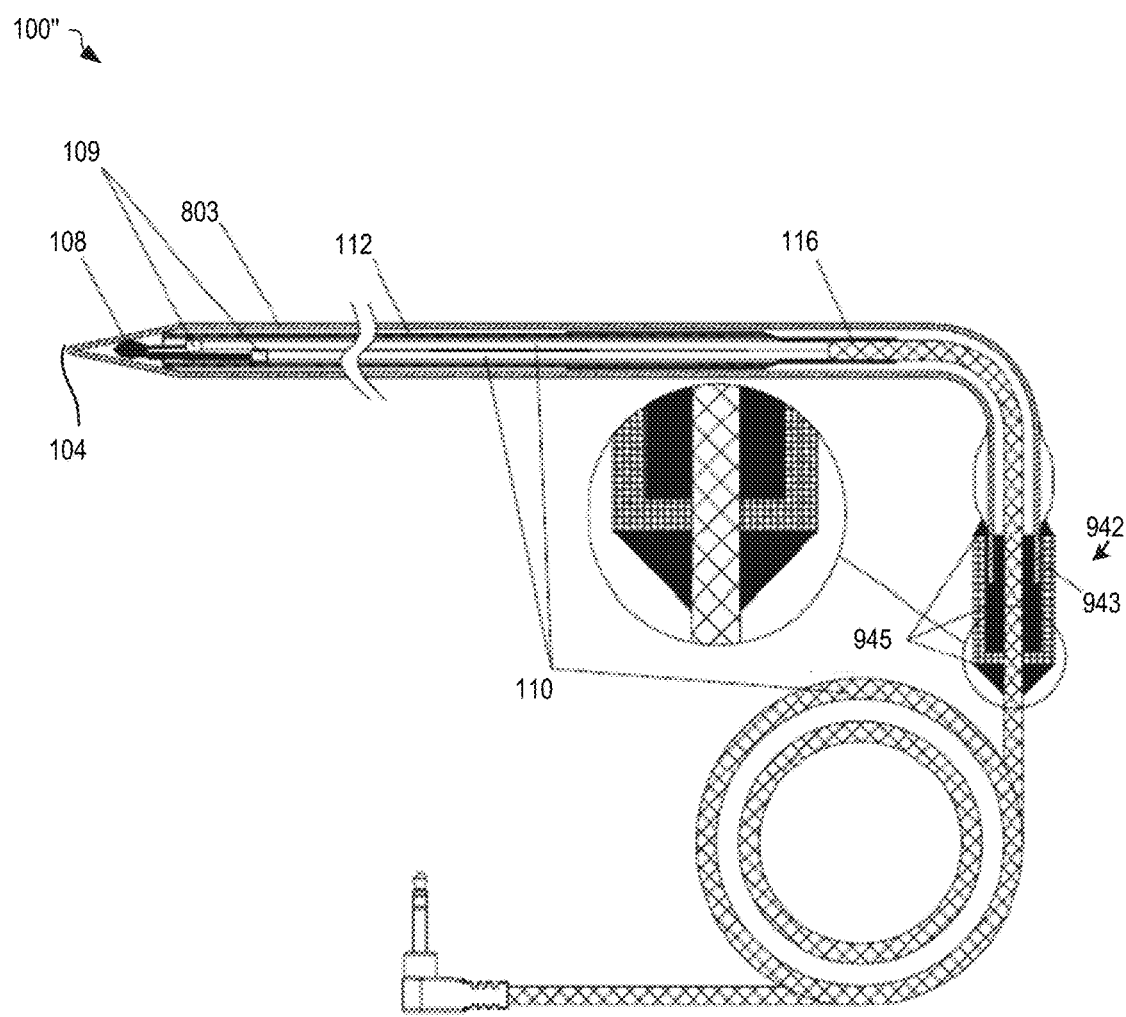
FIG. 9 depicts an exemplary waterproof food thermometer probe having a seal formed with a porcelain portion and one or more high temperature glue portions, in one embodiment.
Figure 10:
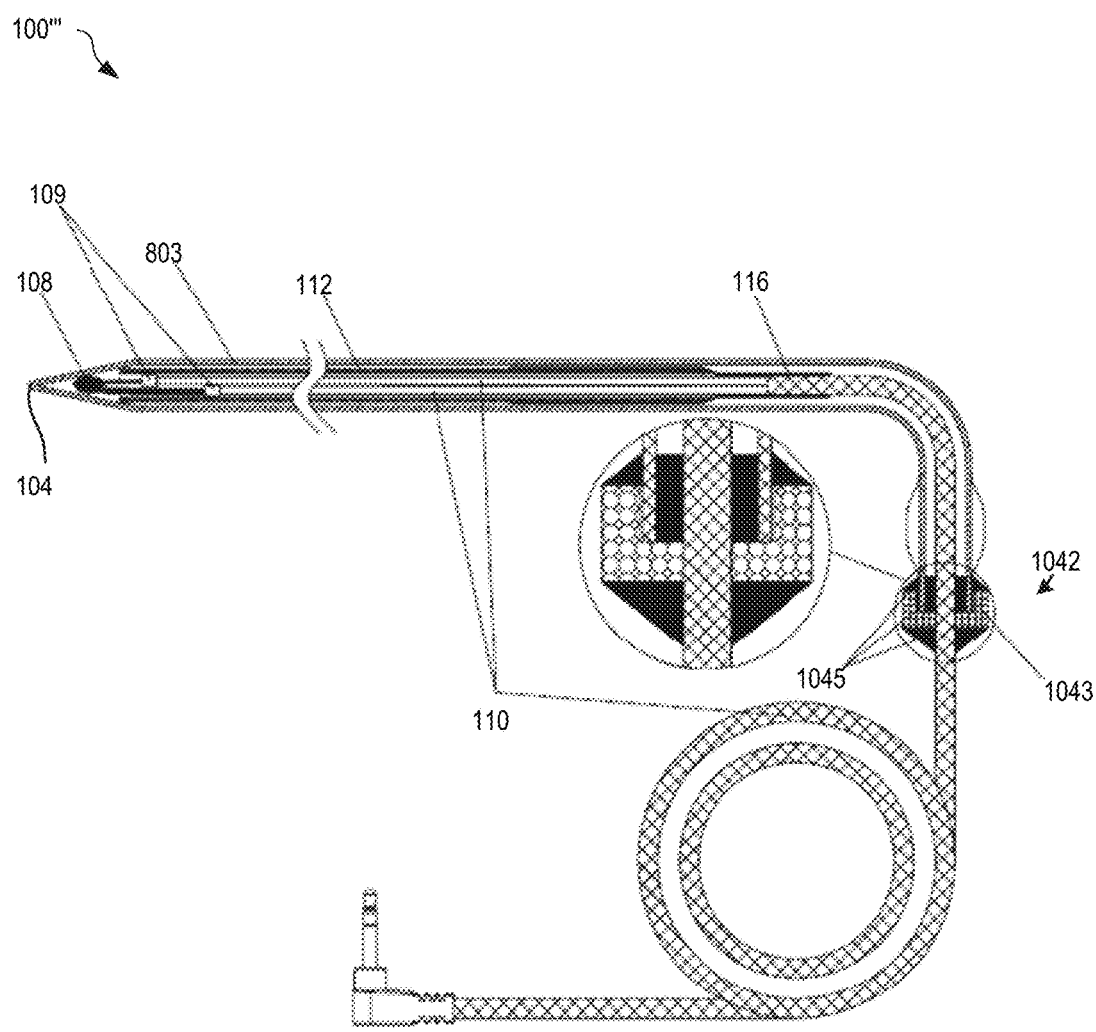
FIG. 10 depicts an exemplary waterproof food thermometer probe having a seal formed with a silicon rubber portion and a high temperature RTV silicon portions, in one embodiment.

FIGS. 8-10 depict alternate embodiments of seal 142. FIGS. 8-10 each depict probe 100 having an alternate embodiment of seal 142. Further, FIGS. 8-10 depict hollow tube 803 which is similar to hollow tube 103 but extends further and includes a bend 804 at a distal end from sensor 108. FIG. 8 depicts seal 842 formed by welding to provide the necessary protection from moisture ingress. FIG. 9 depicts seal 942 including a porcelain portion 943 and one or more high temperature glue portions 945. High temperature glue portions 945 seal probe 100 against ingress of moisture. FIG. 10 depicts seal 1042 including a silicon rubber portion 1043 and a high temperature RTV silicon portion(s) 1045. RTV silicon portions 1045 seal probe 100 against ingress of moisture.

Penetrating portion 102 may further include a securing structure 144 to prevent seal 142 from separating from penetrating portion 102. Securing structure 144 is for example one or more protrusion that extends radially from penetrating portion 102. Seal 142 is then injected around securing structure 144 such that once seal 142 cools seal 142 is prevented from separating from penetrating portion 102.

Figure 7:
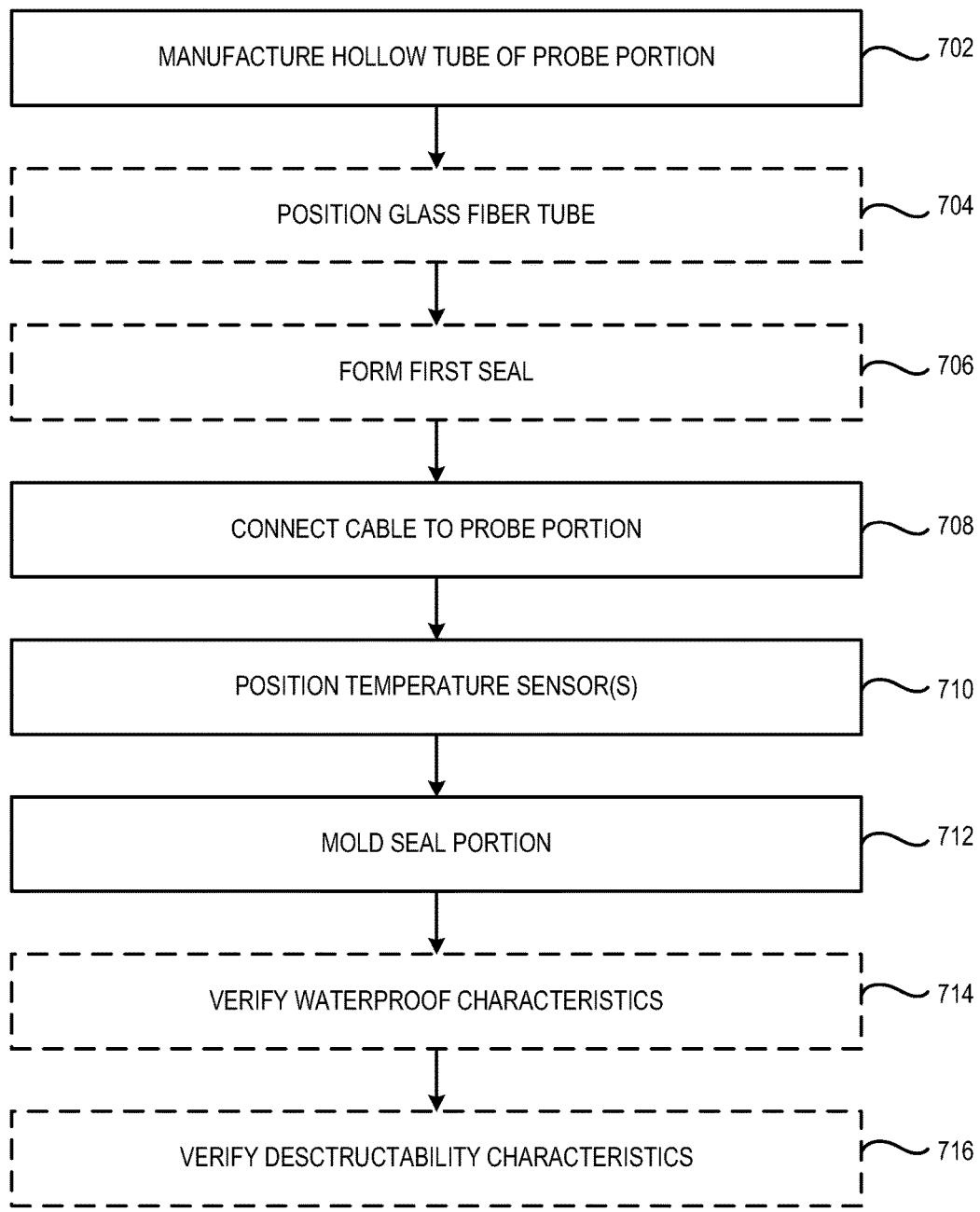
FIG. 7 depicts one exemplary method for manufacturing a waterproof temperature probe, in one embodiment.

FIG. 7 depicts an exemplary method 700 for manufacturing a waterproof temperature probe, in one embodiment. Method 700 is for example used to manufacture probe 100 of FIGS. 1-6. Dashed lines within FIG. 7 represent optional steps as described below.

In step 702, a hollow tube of a penetrating portion is manufactured. For example, hollow tube 103 of penetrating portion 102 may be manufactured. During this step, a securing structure may additionally be manufactured. For example, securing structure 144 may be formed integral with penetrating portion 102. Hollow shell may be manufactured using a sheet of stainless steel that is rolled, welded, cut and/or polished into the desired shape and size.

In optional step 704, a glass fiber tube is secured within hollow shell manufactured in step 702. For example, glass fiber tube 112 is secured within hollow tube 103. Additionally, wires 108 may run through glass fiber tube 112 such that wires 108 may electronically couple to cable 122. Glass fiber tube 112 may be retained within hollow tube 103 via crimping of second end 106 of hollow tube 103 such that pressure applied at second end 106 seals first seal 114 thereby permanently affixing glass fiber tube 112.

In optional step 706, a first seal is secured within the hollow shell, of step 702. For example, first seal 114 is a heat shrink tube that is heat shrunk to glass fiber tube 112 between glass fiber tube 112 and hollow tube 103. The first seal of step 708 may extend in the lengthwise direction of the hollow shell.

In step 708, a cable is connected to the penetrating portion formed within steps 702-708. For example, cable 122 is connected to wires 108 thereby coupling cable 122, penetrating portion 102, and jack 124.

In step 710, a temperature sensor is positioned within hollow tube of step 702. For example, temperature sensor(s) 108 are positioned proximate first end 104 within hollow tube 103. In one embodiment, sensors 108 are freely secured within hollow tube 103. In other words, sensors 108 and connecting wires 110 are guided within hollow tube 103 until sensor(s) 108 reach first end 104. Accordingly, once probe 100 is sealed (discussed below), sensor(s) 108 are retained within hollow tube 103 of probe 100. The lack of a mechanical structure (such as a glue) allows the probe to be more accurate and able to sense higher temperatures. Optionally, a thermal coupling (e.g., a thermally conducting paste) may be used between sensor(s) 108 and hollow tube 103 at end 104.

In step 712, seal portion is molded around a portion of the penetrating portion and the cable. For example, seal 142, made from high temperature resistance plastic, is injection molded around penetrating portion 102 and cable 122. In one embodiment, seal 142 is molded around a securing structure 144 such that seal 142 will not release from penetrating portion 102.

In optional step 714, method 700 verifies that the temperature probe formed in steps 702-712 is waterproof. In one embodiment of step 714, probe 100 is placed into a waterproof testing chamber (for example an IPX6, IPX-7 and/or IPX-8 testing chamber) under 1 meter below water surface, via actual or simulated depth, for water ingress testing.

Probe 100 is then connected to a display unit and used to measure air and/or water temperature to determine accuracy.

In optional step 716, method 700 verifies that the temperature probe formed in steps 702-712 can withstand high temperatures. In one embodiment of step 716, probe 100 is placed within a high temperature chamber (for example up to 500 degrees Fahrenheit) and/or a dish washer. Probe 100 is then connected to a display unit and used to measure air and/or water temperature to determine accuracy.

It will be appreciated that steps 702-716 are note limited in scope to the order as illustrated in FIG. 7.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present system and method, which, as a matter of language, might be said to fall there between.

What is claimed is:

1. A waterproof thermometer probe, comprising:
    a penetrating portion for inserting into food during cooking, the penetrating portion comprising a hollow tube and a temperature sensor located within the hollow tube at a first end, the hollow tube forming a protrusion extending radially therefrom at a second end opposite to the first end;
    a cable (i) protecting electrical wires therein and (ii) coupling the temperature sensor to a display unit separated from the penetrating portion; and,
    a high temperature resistant seal portion permanently covering (i) part of the penetrating portion at the second end of the hollow tube, and (ii) at least part of the cable to provide a first moisture barrier preventing water from entering the hollow tube portion, the high temperature resistant seal portion surrounding the protrusion to prevent separation of the seal portion from the penetrating portion;
    a non-stick coating covering the hollow tube where the high temperature resistant seal portion is not covering the hollow tube.

2. The waterproof thermometer probe of claim 1, the penetrating portion further having a glass fiber tube positioned within a portion of the hollow tube from the second end towards the first end.

3. The waterproof thermometer probe of claim 2, wherein the penetrating portion is crimped to retain the glass fiber tube.

4. The waterproof thermometer probe of claim 2, further comprising a heat shrink material positioned between the outer surface of the glass fiber tube and the inner surface of the hollow tube to form a moisture seal.

5. The waterproof thermometer probe of claim 1, the penetrating portion further comprising a moisture seal for providing a second moisture barrier about the penetrating portion, the moisture seal comprising heat shrink material and covering a portion of the cable and the hollow tube proximate the second end between the hollow tube and the high temperature resistant seal portion.

6. The waterproof thermometer probe of claim 1, the high temperature resistant seal portion comprising high temperature resistant injection molded plastic.

7. The waterproof thermometer probe of claim 1, the high temperature resistant seal portion being resistant of temperatures up to 500 degrees Fahrenheit.

8. The waterproof probe of claim 1, the high temperature resistant seal portion comprising welding.

9. The waterproof probe of claim 1, the high temperature resistant seal portion including a porcelain portion and a high temperature glue portion.

10. The waterproof probe of claim 1, the high temperature resistant seal portion including a silicon rubber portion and a high temperature RTV silicon portion.

11. A method for manufacturing a waterproof thermometer probe, the method comprising:
    forming a hollow tube portion of the probe, the hollow tube forming a protrusion extending radially therefrom at a first end;
    positioning a temperature sensor within the hollow tube portion proximate a second end;
    electrically coupling a cable through the hollow tube portion to the temperature sensor, the cable protecting electrical wires therein; and
    molding a high temperature resistant seal portion around a portion of the cable entering the hollow tube portion, and around part of the first end of the hollow tube portion, the high temperature resistant seal portion surrounding the protrusion to prevent separation of the seal portion from the hollow tube portion; and,
    applying a non-stick coating to the hollow tube portion such that the non-stick coating covers the hollow tube where the high temperature resistant seal portion is not covering the hollow tube.

12. The method of claim 11, further comprising positioning a glass fiber tube within the hollow tube portion and around the electrical wires of the cable that electrically couple to the temperature sensor.

13. The method of claim 11, further comprising positioning a moisture seal within the hollow tube, the moisture seal comprising heat shrink material covering a portion of the cable and a portion of the hollow tube proximate the first end between the hollow tube and the high temperature resistant seal portion.

14. The method of claim 13, further comprising crimping the hollow tube against the moisture seal to retain the glass fiber tube and forming a seal between an outer surface of the glass fiber tube and an inner surface of the hollow tube.

15. The method of claim 11, wherein molding the high temperature resistant seal portion comprises injecting molten plastic that cools to become permanently rigid and shaped.

\* \* \* \* \*

UNITED STATES PATENT AND TRADEMARK OFFICE
CERTIFICATE OF CORRECTION

| | | |
|---|---|---|
| PATENT NO. | : 9,791,328 B2 | |
| APPLICATION NO. | : 14/133266 | |
| DATED | : October 17, 2017 | |
| INVENTOR(S) | : Luk Wah Jackson Chu | |

It is certified that error appears in the above-identified patent and that said Letters Patent is hereby corrected as shown below:

On the Title Page

(71) "Ewig Industries Cacao Commercial Offshore Ltd., Shenzhen (CN)" should read -- Ewig Industries Macao Commercial Offshore Limited, Macau (CN) --;

(73) "EWIG INDUSTRIES MACAO COMMERCIAL OFFSHORE LTD" should read -- Ewig Industries Macao Commercial Offshore Limited --.

Signed and Sealed this
Twentieth Day of February, 2018

Andrei Iancu
*Director of the United States Patent and Trademark Office*